US010284703B1

(12) United States Patent
Lawrence et al.

(10) Patent No.: US 10,284,703 B1
(45) Date of Patent: May 7, 2019

(54) PORTABLE FULL DUPLEX INTERCOM SYSTEM WITH BLUETOOTH PROTOCOL AND METHOD OF USING THE SAME

(71) Applicant: Netabla, Inc., Austin, TX (US)

(72) Inventors: John Lawrence, Austin, TX (US); Jeff Theisen, Austin, TX (US)

(73) Assignee: Netabla, Inc., Austin, TX (US)

( * ) Notice: Subject to any disclaimer, the term of this patent is extended or adjusted under 35 U.S.C. 154(b) by 0 days.

(21) Appl. No.: 15/229,911

(22) Filed: Aug. 5, 2016

Related U.S. Application Data

(60) Provisional application No. 62/201,188, filed on Aug. 5, 2015.

(51) Int. Cl.
| | | |
|---|---|---|
| *H04M 1/725* | (2006.01) | |
| *H04L 5/14* | (2006.01) | |
| *H04B 1/3822* | (2015.01) | |
| *H04W 4/80* | (2018.01) | |
| *H04W 84/20* | (2009.01) | |

(52) U.S. Cl.
CPC ........ *H04M 1/7253* (2013.01); *H04B 1/3822* (2013.01); *H04L 5/14* (2013.01); *H04W 4/80* (2018.02); *H04W 84/20* (2013.01)

(58) Field of Classification Search
None
See application file for complete search history.

(56) References Cited

U.S. PATENT DOCUMENTS

| 4,322,579 A * | 3/1982 | Kleis ................... H03G 9/025 |
| | | 381/106 |
| 4,965,833 A * | 10/1990 | McGregor ............ H04M 9/087 |
| | | 381/83 |
| 2001/0043704 A1* | 11/2001 | Schwartz ................ H03G 3/32 |
| | | 381/98 |
| 2003/0160681 A1* | 8/2003 | Menard ................... E05B 45/06 |
| | | 340/5.64 |
| 2004/0266347 A1* | 12/2004 | Palin ...................... H04L 63/18 |
| | | 455/41.1 |
| 2008/0273714 A1* | 11/2008 | Hartung .................. H04R 5/02 |
| | | 381/86 |
| 2008/0273715 A1* | 11/2008 | Snider ...................... B60R 1/12 |
| | | 381/86 |
| 2013/0260677 A1* | 10/2013 | Partovi .................. H01F 5/003 |
| | | 455/41.1 |
| 2015/0180536 A1* | 6/2015 | Zhang ...................... H04B 3/23 |
| | | 381/66 |
| 2016/0284358 A1* | 9/2016 | Liu ....................... G10L 19/167 |

OTHER PUBLICATIONS

CSR, 8th Generation 1-mic ENR Technology for Handsfree Tuning Guide Issue 6, Jul. 11, 2014, pp. 1-42.*
Webpage: http://www.sena.com/product/smh10/, printed Aug. 5, 2016 (16 pgs.).

(Continued)

*Primary Examiner* — Alejandro Rivero
(74) *Attorney, Agent, or Firm* — DLA Piper LLP (US)

(57) ABSTRACT

A portable full duplex intercom system using Bluetooth and method of use are provided in which the intercom system has a built in microphone and speaker in a device. In one embodiment, the portable full duplex intercom system using Bluetooth may be used in a vehicle to allow the people in the vehicle to communicate with each other.

18 Claims, 3 Drawing Sheets

(56) References Cited

OTHER PUBLICATIONS

Webpage: http://cardosystems.com/portfolio-item/scala-rider-smartpack/, printed Aug. 5, 2016 (3 pgs.).
Webpage: http://www.rocketmoto.com/index.php/brands/autocom/autocom-logic-kit-solo-and-duo.html, printed Aug. 5, 2016 (5 pgs.).
Webpage: http://starcom1.com/advance.html, printed Aug. 5, 2016 (1 pg.).
Webpage: http://www.sena.com/product/bluetoothmicintercom/, printed Aug. 5, 2016 (9 pgs.).
Webpage: http://www.eartec.com/eartecproducts.html, printed Aug. 5, 2016 (4 pgs.).
Webpage: http://www.jabra.com/bluetooth-headsets, printed Aug. 5, 2016 (18 pgs.).
Webpage: http://www.csr.com/proudcts/63/csr8670, printed Aug. 5, 2016 (6 pgs.).

\* cited by examiner

PORTABLE FULL DUPLEX INTERCOM SYSTEM WITH BLUETOOTH PROTOCOL AND METHOD OF USING THE SAME

PRIORITY CLAIMS/RELATED APPLICATIONS

This application claims the benefit of and priority to, under 35 USC 119(e) and 35 USC 120, U.S. Provisional Patent Application Ser. No. 62/201,188, filed Aug. 5, 2015 and entitled "Portable Full Duplex Intercom System With Bluetooth Protocol", the entirety of which is incorporated by reference herein.

FIELD

The disclosure is directed to a portable full duplex intercom system using Bluetooth and in particular to a portable full duplex intercom system using Bluetooth that may be used in a vehicle to allow the people in the vehicle to communicate with each other.

BACKGROUND

Systems exist that allow people to communicate with each other in different environments. For example, communication systems exist that allow people to communicate with each other while both people are riding a motorcycle. However, these systems require an external microphone and speaker and are designed to be primarily wearable. For example, such systems are commercially available at www.sena.com/product/smh10/, cardosystems.com/portfolio-item/scala-rider-smartpack/, www.rocketmoto.com/indes.php/brands/autocom/autocom-logic-kit-solo-and-duo.html and starcom1.com/advance.html.

Systems also exist that are a communication device with a built in microphone, but must utilize an external speaker and are designed to be used in recording audio in conjunction with a camera. An example of a system may be found at www.sena.com/product/bluetoothmicintercom/.

Systems also exist that are wireless headsets and speaker phones which are designed to be an extension of a phone and require connectivity to a telephone to operate properly. Examples of this type of system may be found at www.eartec.com/eartecproducts.html and www.jabra.com/bluetoothheadsets.

Thus, these existing systems require external speakers, and/or external microphones, and/or may require interconnectivity with a telephone, and are designed primarily as a wearable. However, it is desirable to provide a portable full duplex intercom system with Bluetooth protocol that has a built in microphone and speaker that is not designed to be wearable and it is to this end that the disclosure is directed.

DETAILED DESCRIPTION OF ONE OR MORE EMBODIMENTS

The disclosure is particularly applicable to a portable Bluetooth intercom system that may be used for communication in a vehicle with one master device and one slave device and it is in this context that the disclosure will be described. It will be appreciated, however, that the system and method has greater utility since the system can be implemented in different ways that those disclosed below that are within the scope of the disclosure. Furthermore, the system may have one master device and a plurality of slave devices in various embodiments. In addition, the system and method (with the one master and one or more slaves) may be used in various vehicle types, homes, aircraft, watercraft, military locations, offices, worksites, manufacturing plants, outdoors or event production communication as long as the communication between the people is within the Bluetooth communication range.

Figure 1:
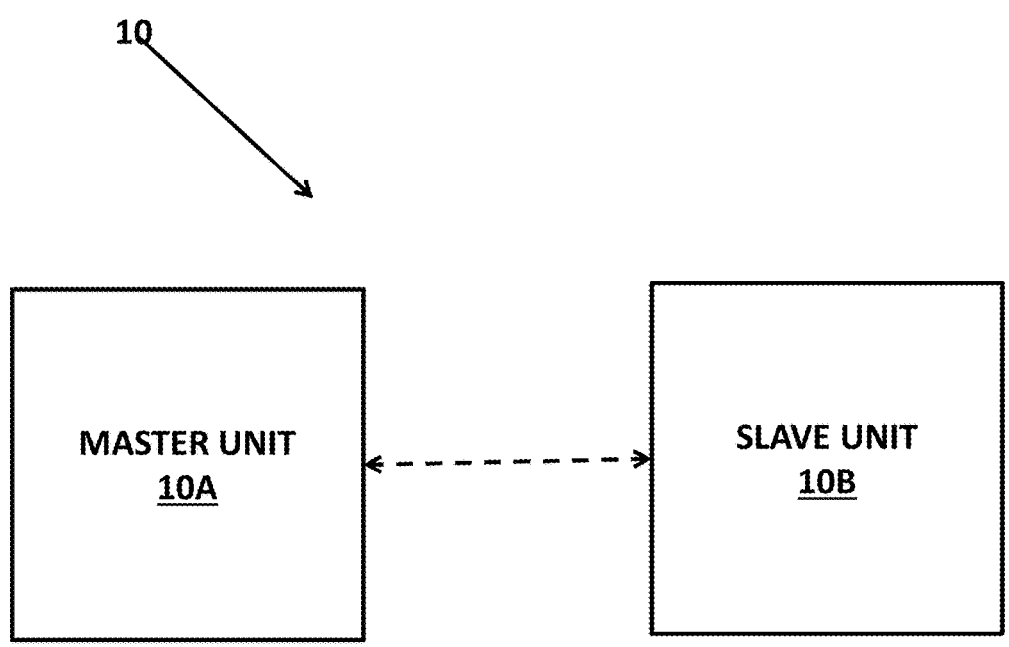
FIG. 1 illustrates an intercom system having a master intercom device and a slave intercom device that use Bluetooth.

FIG. 1 illustrates an intercom system 10 having a master intercom device 10A and one or more slave intercom devices 10B (although only one slave device is shown in FIG. 1) that use Bluetooth to communicate with each other. In the various embodiments of the system 10, the system 10 may use various Bluetooth protocols and versions including Bluetooth v1.0 to Bluetooth v4.2. In one embodiment, the intercom system 10 may be used primarily by occupants positioned in front and rear seats, respectively, of an automobile. Thus, in one embodiment, the intercom system 10 provides a solution to the problem of communication primarily in an automobile, between the front and rear seats of the vehicle.

In the system 10, the master device 10A and the one or more slave devices 10B may be paired to each other per the particular Bluetooth standard being used by the system. The master portable device 10A and the one or more paired slave devices 10B provide full duplex, i.e. talk and listen, communication between the front and rear seat passengers in a vehicle without the need to depress a press-to-talk button by the user. As described below in more detail, each device 10A, 10B may be paired with each other and when activated, initiate a Bluetooth communications session/call between the devices 10A, 10B thus enabling communications between the devices without the need to depress a press-to-talk button by the user. Since there is no need to depress a button to talk, such as is required by a walkie-talkie or other devices, the master and slave devices 10A, 10B operate hands-free.

In operation, the system 10, on start-up or by depressing power button 30 provides wireless communication between the master and slave devices 10A and 10B. During the start-up process, each device 10A, 10B may also configure a digital signal processor settings in each device, levels, echo cancellation, etc., turn on a microphone and speaker in both the devices 10A, 10B such as by using the control processor 26 described below. Once the devices 10A, 10B have started-up, each device may be used to wirelessly communicate the voice of the user adjacent the device to the user adjacent the other device using Bluetooth in a full duplex mode. On power off, each device 10A, 10B may turn all chipsets to power save, or sleep mode.

Figure 2:
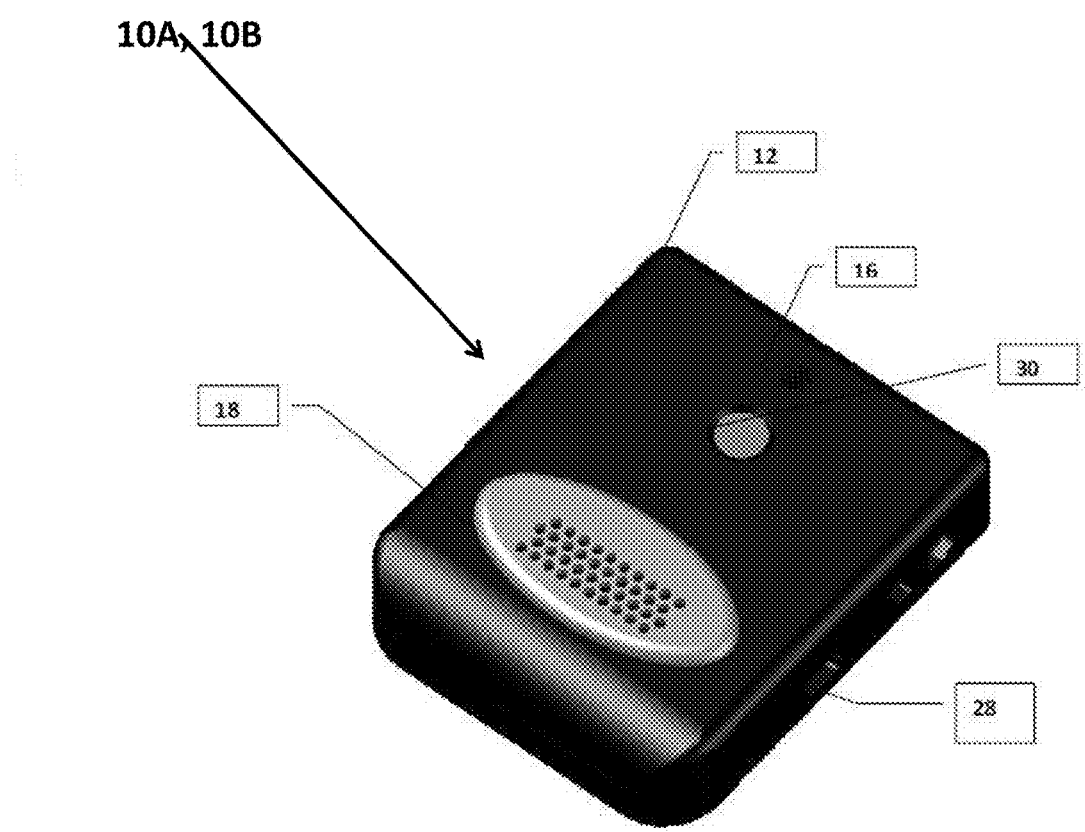
FIG. 2 illustrates more details of each of the master intercom device and each slave intercom device of the intercom system.

FIG. 2 illustrates more details of each of the master intercom device and each slave intercom device of the intercom system. Each of the master device 10A and slave device 10B has a housing 12 that may be various shapes. The housing may incorporate a visor clip or other attachment device or the visor clip or other attachment device may be connected to the housing 10. Each device 10A, 10B may be battery powered to permit use in a wide variety of environments. Each device 10A, 10B may further include a microphone 16 and a speaker 18 that allows the user of each device to both speak and listen to the full duplex communications. Each device 10A, 10B may also have a universal serial bus (USB) port 28 that may be used to recharge the battery of each device 10A, 10B by plugging a charging cord into a source of power. Each device 10A, 10B further has a power button 30 that allows the user to turn the device on and off.

Figure 3:
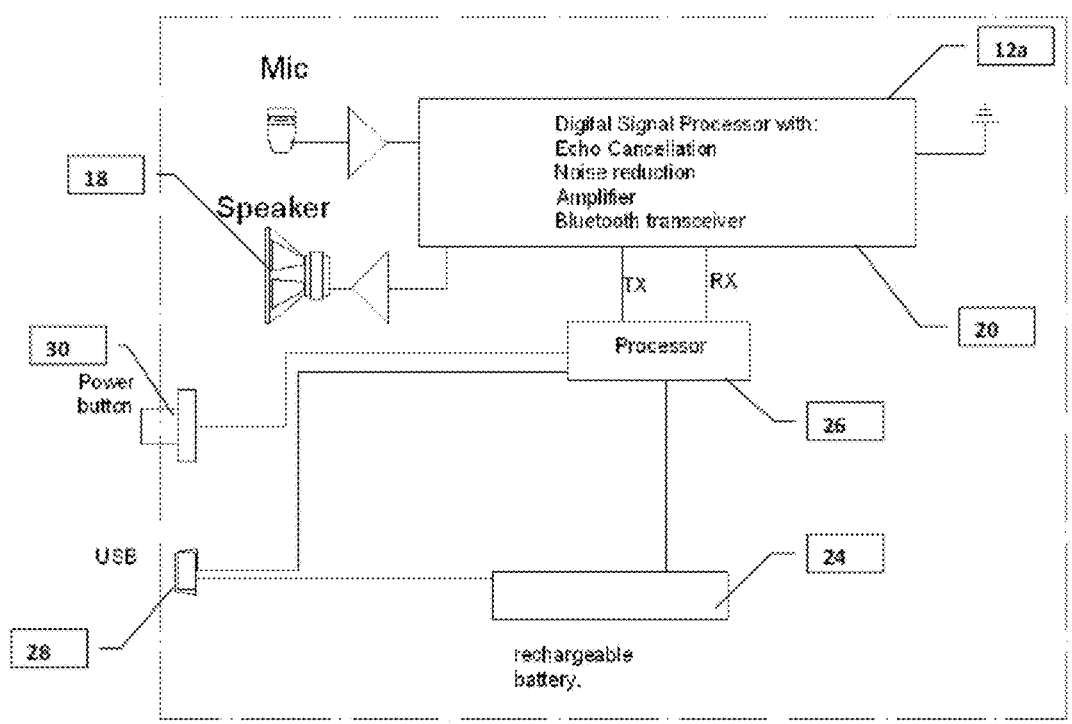
FIG. 3 illustrates more details of the internal circuits and elements of each device.

FIG. 3 illustrates more details of the internal circuits and elements of each device 10A, 10B that are within the housing 12 of each device 10A, 10B. The microphone 16 and speaker 18 are shown in FIG. 6 as well as the USB port 28. Each housing 12 may further house a signal processor 12a, such as a digital signal processor, that may be electrically connected to the microphone 16, speaker 18 and a control processor 26. In one implementation, the signal processor 12a may be a commercially available CSR 8670 (further details of which may be found at www.csr.com/products/63/csr8670 that is incorporated herein by reference) that has been custom configured and described below and is a DSP with various memory elements and incorporates a Bluetooth v 4.1 transceiver. In one implementation, the control processor 26 may be any commercially available 16-bit processor or microcontroller that has built in read only memory (ROM).

The signal processor 12a processes the voice data to/from the microphone 16 and speaker 18. The signal processor 12a may perform echo cancellation, noise reduction and amplification of the voice data. The signal processor 12a may also operate as a Bluetooth transceiver. The control processor 26 may control the overall operations of each device. For example, the control processor 26 may monitor the power level of the rechargeable power source 24, may initiate a call/communications session between the two devices by sending commands to the signal processor 12a and may send volume control signals to the speaker and/or microphone and/or signal processor 12a. A rechargeable battery 24 is also coupled to the Bluetooth transceiver 22 and the digital signal processor 20, via a DC/DC converter to provide power to these circuits of the device. Each Bluetooth DSP transceiver 20 is capable of full duplex communication, one being set for communication as the master unit and one being set for communication as the slave. In one implementation, each device may be set up at the time of manufacture or by the control processor 26 to be either the master device or the slave device and each device may be set so that the master and slave devices can only pair with each other. The battery 24 of each unit is rechargeable via a Port 28, such as a USB port, in a well-known manner. The device may also have a power button 30 that turns the device on or off.

The system is a full duplex wireless intercom system having an open microphone and speaker output. Since the device utilizes battery power, the device needs to have a low current draw. The low current draw of the device is provided by the circuitry shown in FIG. 3 (such as the signal processor 12a) that may be placed into sleep mode or turned off when the device is not transmitting or receiving data from the other device.

In the embodiments of each device 10A, 10B described above, the Bluetooth signal processor 12a in each device is custom configured to be able to operate in the manner described above. In fact, a commercially available, off the shelf, Bluetooth DSP without the custom configuration would not be able to operate in the manner described above. For example, if a commercially available, off the shelf, Bluetooth DSP without the custom configuration were used in each of the devices 10A, 10B, the signal processor 12a in each device, when the devices 10A, 10B are paired, would adjust gain and equalization automatically based on the interaction and close proximity of the devices 10A, 10B to each other and would cause the automatic gain circuits and Howling Control to misinterpret the environment and cancel out all audio. Due to the above issue, each signal processor 12a in each device 10A, 10B is custom configured to in the following manner. On a microphone input side of the signal processor 12a, an Acoustic Echo Canceller may be adjusted for the timing/distance between the microphone and the speaker to account for acoustic coupling. Specifically, a default value for the above commercially available CSR 8670 may be a distance of 1 foot and the custom configuration/setting may be 3 inches. In addition, a Noise Suppression setting may be adjusted for the gain of the microphone in each device. Specifically, a default value for the above commercially available CSR 8670 may be set aggressive at 1 and may be adjusted in the custom configuration to a lower setting of 5. A Howling Control and automatic gain control of each signal processor 12A may be disabled. A Send Equalizer setting of each signal processor 12a may be adjusted for best tone quality with the chosen microphone. Specifically, no send equalizer is used in a default configuration for the above commercially available CSR 8670 while the custom configuration may include a notch filter at 250 Hz and 2500 Hz down 8 db. On the receive output side of the signal processor, a Receive Equalizer may be adjusted for the best tone quality of the speaker. Specifically, no receive equalizer is used in a default configuration for the above commercially available CSR 8670 while the custom configuration may include a high-pass filter at 200 Hz and filtering at 1 kHz and 2.5 kHz. In addition, a Receive Automatic Gain Control of each signal processor 12a may be disabled. In addition, a gain of an Adaptive Equalizer for each signal processor 12a may be adjusted to work with the acoustic response of the speaker. Specifically, the gain of the adaptive equalizer is very aggressive by default for the above commercially available CSR 8670 while the custom configuration may be lowered by 8 db. Using the above custom configurations, each signal processor 12a may be used in each device 10A, 10B, when paired, to provide hands-free communications between the two devices 10A, 10B.

Although illustrative embodiments have been shown and described, a wide range of modification, change and substitution is contemplated in the foregoing disclosure and in some instances, some features of the embodiments may be employed without a corresponding use of other features. Accordingly, It is appropriate that the appended claims be construed broadly an in a manner consistent with the scope of the embodiments disclosed herein.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A communication system comprising:
 a Bluetooth master device detachably located on a vehicle adjacent a front seat of the vehicle;
 a Bluetooth slave device detachably located on the vehicle adjacent a rear seat of the vehicle that communicates in full duplex via a Bluetooth protocol with the Bluetooth master device;
 each of the Bluetooth master and slave devices having a housing with a microphone and a speaker within the housing that are each coupled to respective configured Bluetooth signal processor transceivers with a custom configuration to provide the full duplex communication, of voice input at the microphones, between the Bluetooth master device and the Bluetooth slave device, the configured Bluetooth signal processor transceivers coupled to a rechargeable power source; and
 the custom configuration of the configured Bluetooth signal processor transceivers including an echo canceller on a microphone input side set to less than 1 foot, a send equalizer including a notch filter and a receive equalizer including a high-pass filter.

2. The system of claim 1, wherein the Bluetooth master device configured Bluetooth signal processor transceiver is set for communication as a master unit.

3. The system of claim 1, wherein each of the Bluetooth master and slave devices further comprises a control processor coupled to their respective Bluetooth signal processor transceiver.

4. The system of claim 1, wherein each of the Bluetooth master and slave devices further comprises a port that is configured to recharge the rechargeable power source.

5. The system of claim 4, wherein the port is a universal serial bus port.

6. The system of claim 2, wherein Bluetooth slave device Bluetooth configured signal processor transceiver is set for communication as a slave device.

7. The system of claim 1, wherein each of the Bluetooth master and
 slave devices include a power switch.

8. The system of claim 1, wherein the notch filter is at 250 Hz and 2500 Hz.

9. The system of claim 1, wherein the high-pass filter at 200 Hz.

10. The system of claim 1, wherein each of the Bluetooth master device and the Bluetooth slave device is portable.

11. A device, comprising:
 a housing detachably located on a vehicle adjacent a seat of the vehicle;
 a microphone and a speaker within the housing;
 a configured Bluetooth signal processor transceiver with a custom configuration for use with the speaker and microphone within the housing, the configured Bluetooth signal processor transceiver being coupled to each of the microphone and the speaker and configured to provide full duplex Bluetooth communication of voice input at the microphone and at the microphone of a second device detachably located on the vehicle adjacent a second seat of the vehicle;
 a rechargeable power source coupled to the configured Bluetooth signal processor transceiver; and
 the custom configuration of the configured Bluetooth signal processor transceiver having an echo canceller on a microphone input side set to less than 1 foot, a noise suppressor, a send equalizer including a notch filter, a receive equalizer including a high-pass filter and automatic gain control disabled.

12. The device of claim 11 further comprising a control processor coupled to the configured Bluetooth signal processor transceiver.

13. The device of claim 11 further comprising a port that is configured to recharge the rechargeable power source.

14. The device of claim 13, wherein the port is a universal serial bus port.

15. The device of claim 11 further comprising a power switch.

16. The device of claim 11, wherein the notch filter is at 250 Hz and 2500 Hz.

17. The device of claim 11, wherein the high-pass filter at 200 Hz.

18. The device of claim 11, wherein the housing is portable.

* * * * *